May 9, 1944.   R. D. SMITH   2,348,697
BENDING APPARATUS
Filed June 1, 1943   2 Sheets-Sheet 1

Inventor
Roy D. Smith

By
Merrill M. Blackburn
Attorney

May 9, 1944.  R. D. SMITH  2,348,697
BENDING APPARATUS
Filed June 1, 1943  2 Sheets-Sheet 2
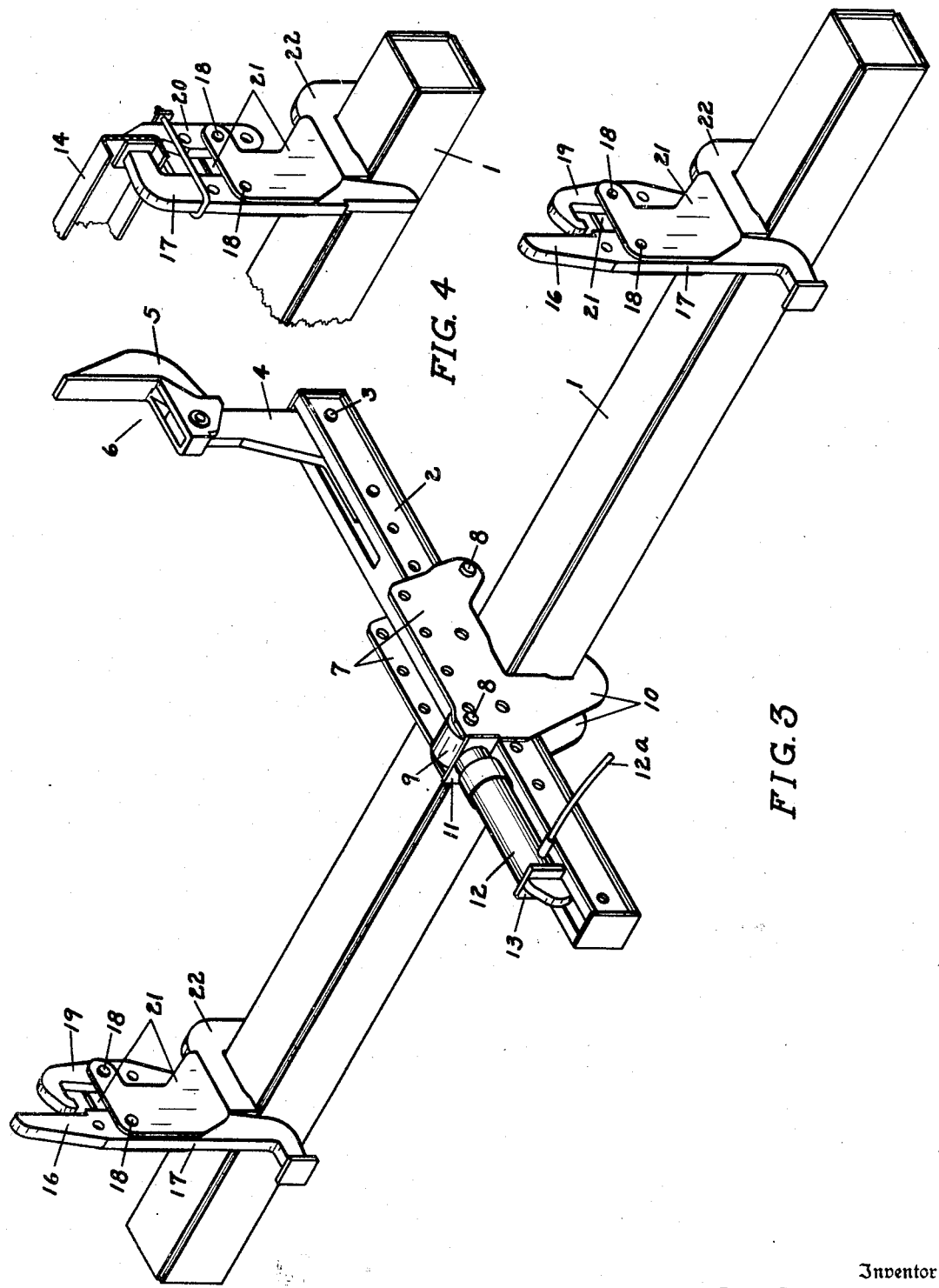
Inventor
Roy D. Smith
By
Merrill M. Blackburn
Attorney Patented May 9, 1944

2,348,697

UNITED STATES PATENT OFFICE 2,348,697

BENDING APPARATUS

Roy D. Smith, Mertzon, Tex., assignor to Bee-Line Company, Scott County, Iowa, a copartnership Application June 1, 1943, Serial No. 489,295

5 Claims. (Cl. 153—32)

The present invention relates to mechanical means for bending or straightening elongated members, such as automobile frames or frame members or other comparable structural elements. Primarily it is intended to be used, at the present time, for the reconditioning of motor vehicle frames which have become distorted by reason of the present war conditions. However, it will be understood that it is not restricted to this field of use.

Among the objects of this invention are the provision of a portable device for the purpose indicated; the provision of a light but strong unit which may be carried into the field of operations upon a repair truck and handled in parts by a small number of men who may set it up to operate upon a distorted vehicle; the provision of a device of the character indicated in which the parts are readily connectible and disconnectible so that they may be handled by one man; the provision of a structure of the character indicated in which various ones of the parts are readily reversible for use in different situations and under different conditions; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 3 shows a perspective of this apparatus detached from the vehicle frame; and Fig. 4 represents one of the work units reversed and attached to a channel-shaped side frame member for exerting pressure thereon without distorting either of the flanges of the channel.

Figure 1:
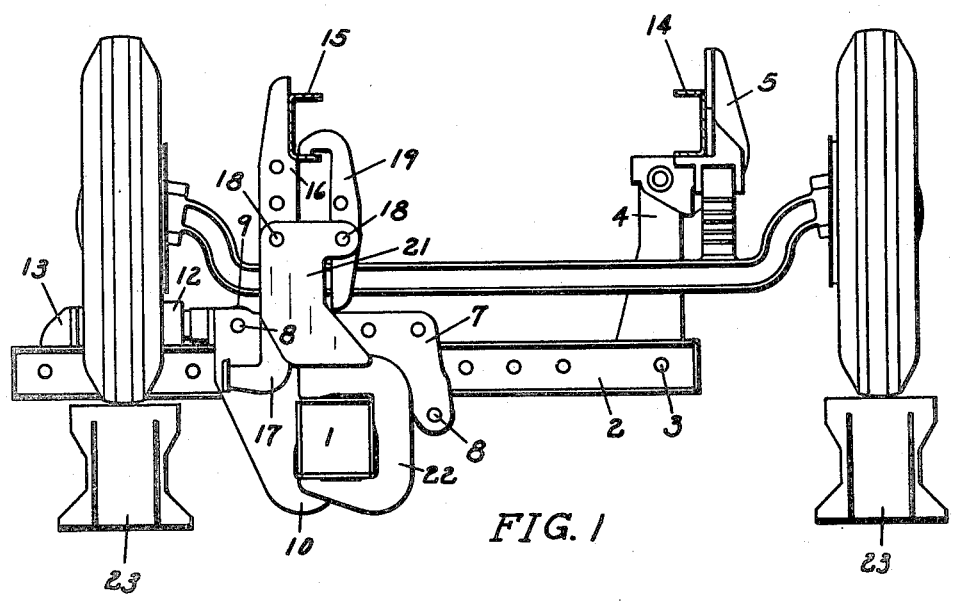
Fig. 1 represents a part of a vehicle in front elevation with my invention applied thereto for use in operating upon the vehicle frame.
Figure 2:
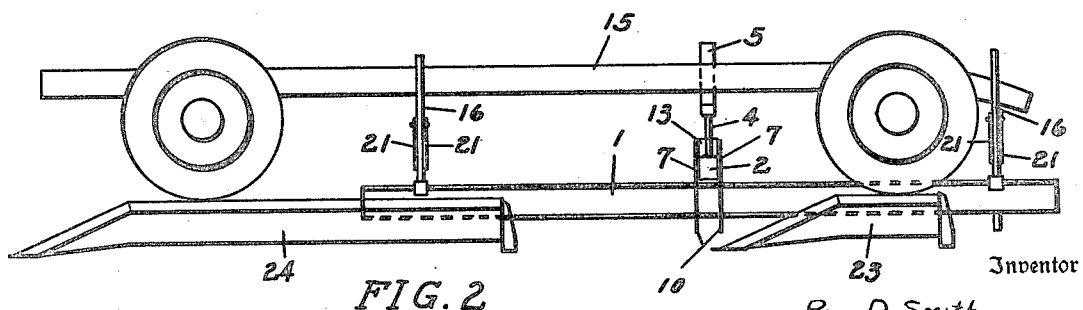
Fig. 2 represents a side elevation of this invention applied to a truck frame for the bending of parts thereof.

Reference will now be made in greater detail to the annexed drawings for a more complete description of this invention. By preference, the strain-resisting bar or beam 1 is hollow and rectangular and may have the other parts placed anywhere along the length thereof. A transverse bar 2 is longitudinally reciprocable, transversely of the beam 1, and is hollow, being provided with transverse openings for the reception of pins whereby a work unit may be held in predetermined location merely by insertion of a pin 3 through an opening extending transversely of the bar 2 and also of the body of the work unit 4, this latter comprising a head 5 which is constructed to receive a vehicle frame member in the notch 6 of the head.

A connector 7 made up of parallel side plates held together by means of suitable pins 8 connects the bars or beams 1 and 2 so that they are relatively slidable. One of these pins 8 is shown as extending through a roller 9 while a similar pin 8 below the beam 2 extends through a corresponding roller which is not shown in the drawings. These rollers make it easy for the beam 2 to slide longitudinally within the connector, as is quite obvious from the drawings. As is shown more particularly in Fig. 3, the side plates of the connector 7 are provided with hooks 10 which engage and receive the bar 1 and therefore hold the connector in place upon this bar. It will be noted that the rollers 9 are upon opposite sides of the bar 2 so that longitudinal movement of the bar will be easy.

A plate 11 may constitute a part of the connector 7 or may be separate therefrom but, in either case, it serves as an abutment against which the power unit 12 exerts pressure in one direction. At the opposite end of the power unit 12 is an abutment 13 which is connected to the bar 2 and it will therefore be seen that as the power unit 12 exerts pressure in opposite directions, the tendency is to cause longitudinal movement of the bar 2 with respect to the bar 1. When this happens, the bar 2 is slid longitudinally, transversely of the bar 1, and carries with it the head 5 bearing against the frame member 14.

Bearing against the outside of the second frame member 15 are work tools 16 which support the bar 1 and are held thereby against transverse movement. The power unit 12 is shown in the drawings as a hydraulic jack to which leads a pipe 12a for the operation thereof. It will readily be understood that when the jack causes longitudinal movement of the bar 2 there is relative movement of the work tools and the head 5. Therefore, if the tools 16 are secured to one frame member of a motor vehicle and the head 5 presses against the outside of the second frame member, movement of the bar 2 will cause bending of the frame members. In order for this to happen, the bar 1 must be capable of resisting more bending strain than the motor vehicle frame.

As shown in Fig. 4, the element 17 of the work unit 16 may be reversed by removing the pin 18 and turning the member 17 end for end. This adapts this unit for engagement with the inside of the channel-shaped frame member 14, as will be obvious from Fig. 4. When this is to be done, the hook-shaped member 19 is removed and replaced by a flat faced member 20. A pair of side plates 21 are secured to a hook 22 which, as shown in Fig. 1, engage around the bar 1.

Preferably two pairs of ramps 23 and 24 are provided so that the vehicle may be run up on these, thereby getting the frame members 14 and 15 sufficiently high above the ground to accommodate the bar 1 and the hooks 10 and 22. This is quite obvious from Fig. 1. It is also obvious that the location of this equipment with relation to the vehicle frame will depend upon the location of the bend which is to be straightened. Various holes are provided along the length of the bar 2 for adjustment of the positions of the abutments 4 and 13.

From the foregoing description, taken in conjunction with the annexed drawings, it will be seen that this apparatus can be readily disassembled and placed, piece by piece, in a truck and transported to wherever it is needed. Then the ramps can be placed in front of the wheels, as desired, and the vehicle be run up thereon, and then the bending equipment can be assembled in position, piece by piece, and adjusted to the exact location necessary for producing the desired bending. The power unit 12 is then installed and the power applied to cause the correction needed. After this has been accomplished, the bending equipment may be again disassembled and placed in the service truck to remain until the next time it is needed. It is clear that all this can be accomplished with the minimum amount of help inasmuch as the apparatus can be substantially completely disassembled and can be re-assembled and held together by means of readily insertable and removable pins, no bolts and nuts being required.

It will of course be understood that the specific description of structure set forth above may be departed from without departing from the spirit of this invention as set forth herein and in the appended claims.

Having now described my invention, I claim:

1. In apparatus of the nature indicated, a tool-supporting beam, means for supporting said beam from the frame of a motor vehicle, a cross-beam supported by said tool-supporting beam, resting thereon, and adapted to support work members, and work members supported on said beams, one of said work members being extensible and, when extended, being adapted to cause movement of the cross-beam with relation to the first mentioned beam, transversely thereof.

2. Straightening equipment for straightening automobile frames, comprising a tool-supporting and strain sustaining bar, means for suspending said bar from the frame of a motor vehicle, frame engaging tools mounted thereon and sustained thereby, a second bar for holding tools, the second bar extending transversely of the first bar and being longitudinally slidable transversely thereof, a work tool carried by the second bar, and work means for moving the second bar transversely of the first bar, the frame-engaging and work tools engaging opposite sides of an automobile frame or a part thereof and, when said work means is extended, causing bending of the frame or frame part.

3. Mechanism for working upon motor vehicle frames, comprising supports for the motor vehicle, frame-engaging tools for engagement with the frame of a motor vehicle, a strain-withstanding beam connecting some of said tools and being supported thereby from said frame, a second beam extending transversely of the first beam, abutment means movably connected with said beams, one of said frame-engaging tools being attached to the second beam for movement therewith and for engagement with the motor vehicle frame, and power means, reacting between said abutment means, for moving the second beam longitudinally, transversely of the first beam.

4. Metal bending equipment, comprising a pair of strain-resisting bars, carrying work-engaging tools, said bars extending transversely with respect to each other, a connector for operatively connecting said bars, said connector having an opening therethrough through which one of said bars is slidable longitudinally and having an abutment to be engaged by a power unit, a second abutment on said one of said bars for engagement by said power unit, said one of said bars being moved longitudinally when power is applied to said power unit, and a power unit between said abutments to exert pressure against both of them.

5. In apparatus of the class described, a strain-resisting bar, a pair of hangers thereon, provided with hook-shaped members for attachment to a motor vehicle frame, whereby the bar may be suspended from said frame, a second bar slidable transversely of the first mentioned bar, a frame-engaging abutment carried thereby, a connector for connecting said bars, said connector being provided with an opening through which the second bar is slidable, said connector having an abutment for engagement by power applying means, and a second abutment on the second bar to be engaged by said power applying means whereby, when power is exerted, the second bar will be moved transversely of the first bar to exert bending force upon said frame.

ROY D. SMITH.